United States Patent
Yamagishi

(10) Patent No.: US 7,099,236 B2
(45) Date of Patent: Aug. 29, 2006

(54) WORKER MANAGEMENT DEVICE

(75) Inventor: Junichi Yamagishi, c/o Unirec Co., Ltd., 6-3, 2-Chome, Kaminarimon, Taito-ku, Tokyo (JP) 111-0034

(73) Assignees: Unirec Co., Ltd., Tokyo (JP); Junichi Yamagishi, Tokyo (JP)

( * ) Notice: Subject to any disclaimer, the term of this patent is extended or adjusted under 35 U.S.C. 154(b) by 298 days.

(21) Appl. No.: 10/143,219

(22) Filed: May 9, 2002

(65) Prior Publication Data

US 2003/0210610 A1 Nov. 13, 2003

(51) Int. Cl.
*G04B 47/00* (2006.01)
*G04F 3/00* (2006.01)
*G06F 17/60* (2006.01)

(52) U.S. Cl. .................. 368/10; 702/178; 705/32; 713/178

(58) Field of Classification Search .............. 368/9, 368/10, 11; 346/20, 80, 82; 235/377; 340/825.31–34; 705/32; 702/178; 713/178
See application file for complete search history.

(56) References Cited

U.S. PATENT DOCUMENTS

| | | | | |
|---|---|---|---|---|
| 4,210,899 A | * | 7/1980 | Swonger et al. | 382/125 |
| 4,270,043 A | * | 5/1981 | Baxter et al. | 235/419 |
| 4,506,274 A | * | 3/1985 | Coe | 346/82 |
| 4,812,627 A | * | 3/1989 | Wexler et al. | 705/32 |
| 4,995,086 A | * | 2/1991 | Lilley et al. | 382/124 |
| 5,337,043 A | * | 8/1994 | Gokcebay | 340/5.67 |
| 5,459,657 A | * | 10/1995 | Wynn et al. | 705/32 |
| 5,552,766 A | * | 9/1996 | Lee et al. | 340/541 |
| 5,615,622 A | * | 4/1997 | Moses et al. | 109/2 |
| 5,903,225 A | * | 5/1999 | Schmitt et al. | 340/5.25 |
| 6,075,455 A | * | 6/2000 | DiMaria et al. | 340/5.82 |
| 6,110,041 A | | 8/2000 | Walker et al. | |
| 6,343,988 B1 | | 2/2002 | Walker et al. | |
| 6,373,967 B1 | * | 4/2002 | Pu et al. | 382/115 |
| 6,527,638 B1 | | 3/2003 | Walker et al. | |
| 6,591,242 B1 | * | 7/2003 | Karp et al. | 705/2 |
| 6,709,333 B1 | | 3/2004 | Bradford et al. | |
| 2002/0068624 A1 | | 6/2002 | Ellis | |
| 2002/0160834 A1 | | 10/2002 | Urie et al. | |
| 2003/0162591 A1 | | 8/2003 | Nguyen et al. | |
| 2003/0186739 A1 | | 10/2003 | Paulsen et al. | |
| 2003/0195037 A1 | | 10/2003 | Vuong et al. | |
| 2003/0228900 A1 | | 12/2003 | Yamagishi | |
| 2004/0038733 A1 | | 2/2004 | Walker et al. | |

FOREIGN PATENT DOCUMENTS

| | | |
|---|---|---|
| JP | 2-26582 | 1/1990 |
| JP | 3-273381 | 12/1991 |

(Continued)

*Primary Examiner*—Vit W. Miska
(74) *Attorney, Agent, or Firm*—Jordan and Hamburg LLP

(57) ABSTRACT

A worker management device comprises time clocks (CL1) provided in a plurality of work places for having worker's entrance and exit times recorded therein and managing means (CL2) for inputting time recording information from the respective time clocks and managing the work place where the worker entered and exited and how long he/she has engaged therein. The time clocks each comprise fingerprint inputting means (CL11) for inputting a fingerprint of each worker, worker specifying means for having personal information and fingerprint information of each worker stored therein in advance, conducting collation of the input fingerprint with the fingerprint inputting means to specify the worker, and time recording means (CL13) for having worker's entrance and exit times recorded therein on the basis of the specification of the worker by the worker specifying means.

8 Claims, 6 Drawing Sheets

FOREIGN PATENT DOCUMENTS

| | | |
|---|---|---|
| JP | 4-241893 | 8/1992 |
| JP | 6-76139 | 3/1994 |
| JP | 6-208611 | 7/1994 |
| JP | 6-223248 | 8/1994 |
| JP | 6-282717 | 10/1994 |
| JP | 10-208097 | 8/1998 |
| JP | 11-134528 | 5/1999 |

* cited by examiner

WORKER MANAGEMENT DEVICE

BACKGROUND OF THE INVENTION

1. Field of the Invention

The present invention relates to a worker management device for managing a working situation of employees based on collation of fingerprint.

2. Description of the Related Art

Conventionally, a management of working situations of employees of a work place or an office is conducted by recording entrance and exit times using a time clock.

However, a conventional time clock is not suitable for determining where and how long which employee has been engaged. For example, in the work place, in addition to full-time workers, various workers such as temporary workers, part-time workers, or the like, as well as staggered work shifts exist. Further, in addition to the headquarters, a plurality of work places such as respective branch offices, sales offices, or the like exist. Therefore, it is difficult to accurately determine at which work place each of employees is at present and how long he/she has engaged in that place only by recording of entrance and exit times of each worker using a time clock.

SUMMARY OF THE INVENTION

The present invention provides a worker management device, capable of easily determining at which work place each employee is at present and how long he/she has engaged in various forms of work and according to type of worker.

A first aspect of the invention provides a worker management device comprising, time clocks provided in a plurality of work places, for recording entrance and exit times for each worker, managing means for inputting time recording information from each time clocks and determining where the worker has entered and exited and how long he/she has engaged therein, and worker specifying means for specifying the worker. The time clocks each have the entrance and exit times recorded therein on the basis of the specification of the worker by the worker specifying means.

According to the first aspect, the time clocks each can conduct the time recording of entrance and exit time of each worker on the basis of the specification of the worker by the worker specifying means. The managing means can input the time recording information from the respective time clocks and determine the work place where the worker entered and exited and how long he/she has engaged therein. Therefore, it is possible to easily determine at which work place which worker is at present and how long he/she has engaged.

A second aspect of the invention provides a worker management device comprising, time clocks provided in a plurality of work places, for recording entrance and exit times for each worker, and managing means for inputting time recording information from the respective time clocks and determining where the worker has entered and exited and how long he/she has engaged therein. The time clocks each comprise fingerprint inputting means for inputting a fingerprint of each worker, worker specifying means for having personal information and fingerprint information of each worker stored therein in advance, conducting collation of the input fingerprint inputted with the fingerprint inputting means to specify the worker, and time recording means for recording entrance and exit times on the basis of the specification of the worker by the worker specifying means.

According to the second aspect, when the fingerprint inputting means of each of the time clocks inputs the fingerprint, the worker specifying means can conduct the collation of the input fingerprint on the basis of the personal information and the fingerprint information of the worker stored in advance, to specify the worker. The time recording means can conduct the time recording of entrance and exit times of each worker on the basis of the specification of the worker by the worker specifying means. The managing means can input the time recording information from the respective time clocks and determine the work place where the worker entered and exited and how long he/she has engaged therein. Therefore, it is possible to easily determine at which work place which worker is at present and how long he/she has engaged.

A third aspect of the invention provides the worker management device according to the second aspect, wherein the time clocks each comprise information inputting means for inputting personal information, and the worker specifying means reads the stored personal information and fingerprint information according to the input personal information inputted with the information inputting means to conduct the collation.

According to the third aspect, in addition to the effect of the second aspect, the time clocks each comprise the information inputting means for personal information, and the worker specifying means can read the stored personal information and fingerprint information according to the input personal information inputted with the information inputting means, and conduct the collation. Therefore, it is possible to read the personal information and the fingerprint information of the specified worker from the personal information and the fingerprint information of all the stored workers according to the input personal information. According to the third aspect conducts the fingerprint collation on the basis of the read personal information and fingerprint information, which enables the rapid processing.

A fourth aspect of the invention provides the worker management device according to the second or third aspect, wherein the managing means comprises data storing means for storing the fingerprint information and the personal information of the worker therein in advance and outputting the respective information to the time clocks, and being inputted the time recording information from the time clocks therein, a registration terminal device for inputting the fingerprint information and the personal information of the worker into the data storing means in advance, and a management terminal device for inputting the time recording information from the data storing means therein and managing a working situation of each worker on the basis of the time recording information.

According to the fourth aspect, in addition to the effect of the second or third aspect, the data storing means can have the fingerprint information and the personal information of the worker stored therein in advance, output the respective information to the time clocks, and is inputted the time recording information from the time clocks. The registration terminal device can input the fingerprint information and the personal information of the worker into the data storing means in advance. The management terminal device can input the time recording information from the data storing means therein, and determine the working situation of the worker on the basis of the time recording information. Therefore, it more accurately conducts the management of the working situation of the worker according to the accurate registration and storage of the fingerprint information and the personal information, and the input of the accurate time recording information.

A fifth aspect of the invention provides the worker management device according to any one of the second to fourth aspects, wherein the work places each comprise an electric lock door for entrance and exit, and the time clocks each output a lock release signal to the electric lock door on the basis of the worker specification by the worker specifying means.

According to the fifth aspect, in addition to the effect of any one of the second to fourth aspects, the work places each comprise an electric lock door for entrance and exit, and the time clocks each can output a lock release signal to the electric doors on the basis of the worker specification by the worker specifying means. Therefore, it is possible to give permission or non-permission for entrance or exit by utilizing the time clocks.

DETAILED DESCRIPTION OF THE PREFERRED EMBODIMENT

Figure 1:
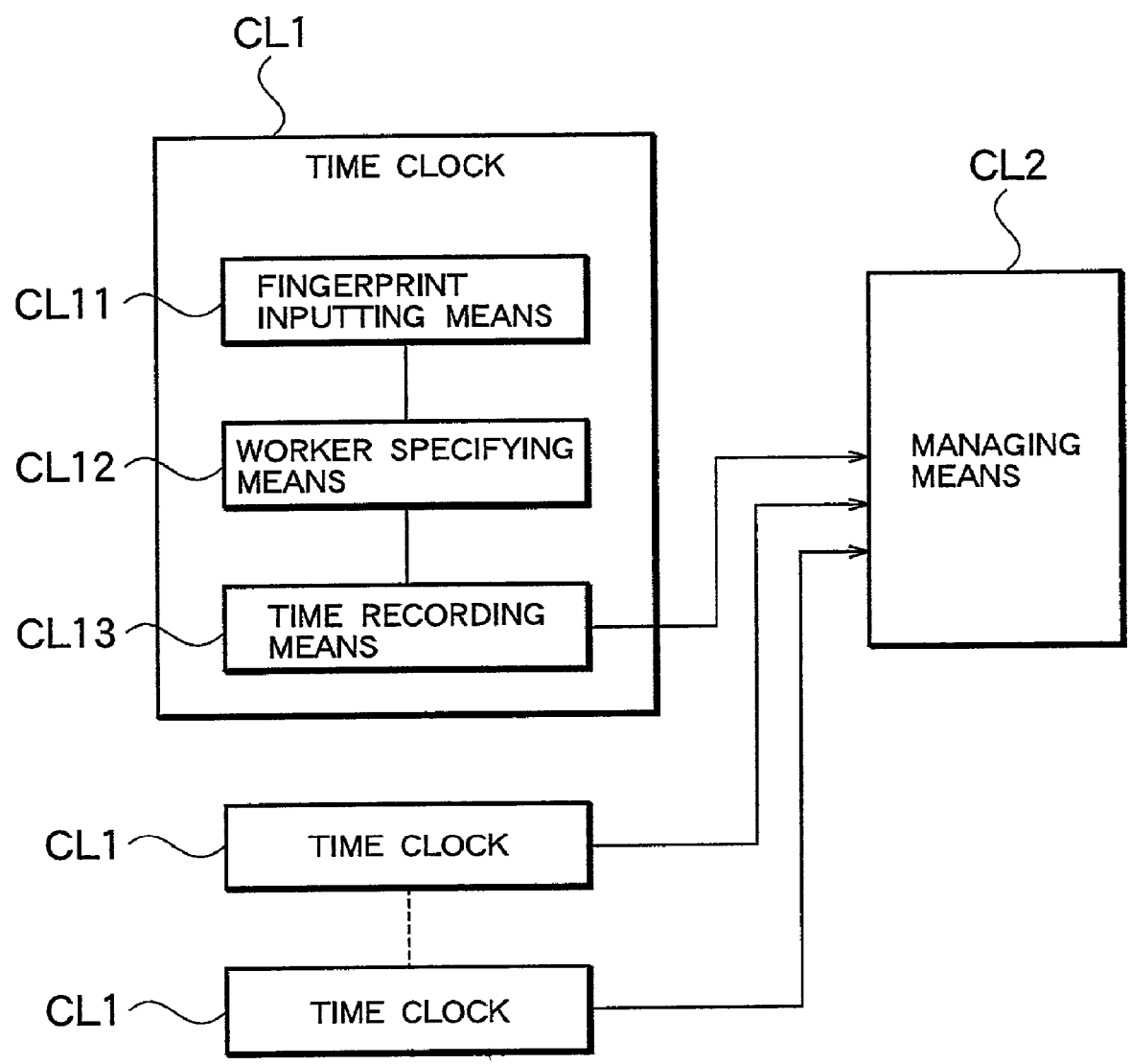
FIG. 1 is a configuration diagram showing a worker management device according to the present invention.

FIG. 1 is a configuration diagram showing a worker management device according to the present invention. As shown in FIG. 1, a worker management device according to the present invention comprises time clocks CL1 and managing means CL2. The time clocks CL1 are provided in a plurality of work places, and are directed for having worker's entrance and exit times recorded therein in each workplace. These time clocks CL1 each comprise fingerprint inputting means CL11, worker specifying means CL12, and time recording means CL13.

The fingerprint inputting means CL11 is directed for inputting a fingerprint of each worker. The worker specifying means CL12 is directed for storing personal information and fingerprint information of each worker therein in advance, conducting collation of the input fingerprint inputted with the fingerprint inputting means CL11, and specifying the worker.

The time recording means CL13 is directed for recording entrance and exit times of each worker on the basis of the specification of the worker. The managing means CL2 is directed for inputting time recording information from the respective time clocks CL1, and determining the work place where each worker entered and exited and how long he/she has engaged.

Therefore, according to the management of the managing means CL2, a determination is made on whether the time recording information has been inputted from the time clock CL1 in which work place, so that it is possible to easily determine at which work place the worker is at present. Further, it is possible to easily determine how long the worker has engaged in that work place according to the time recording information of worker's entrance and exit times.

Figure 2:
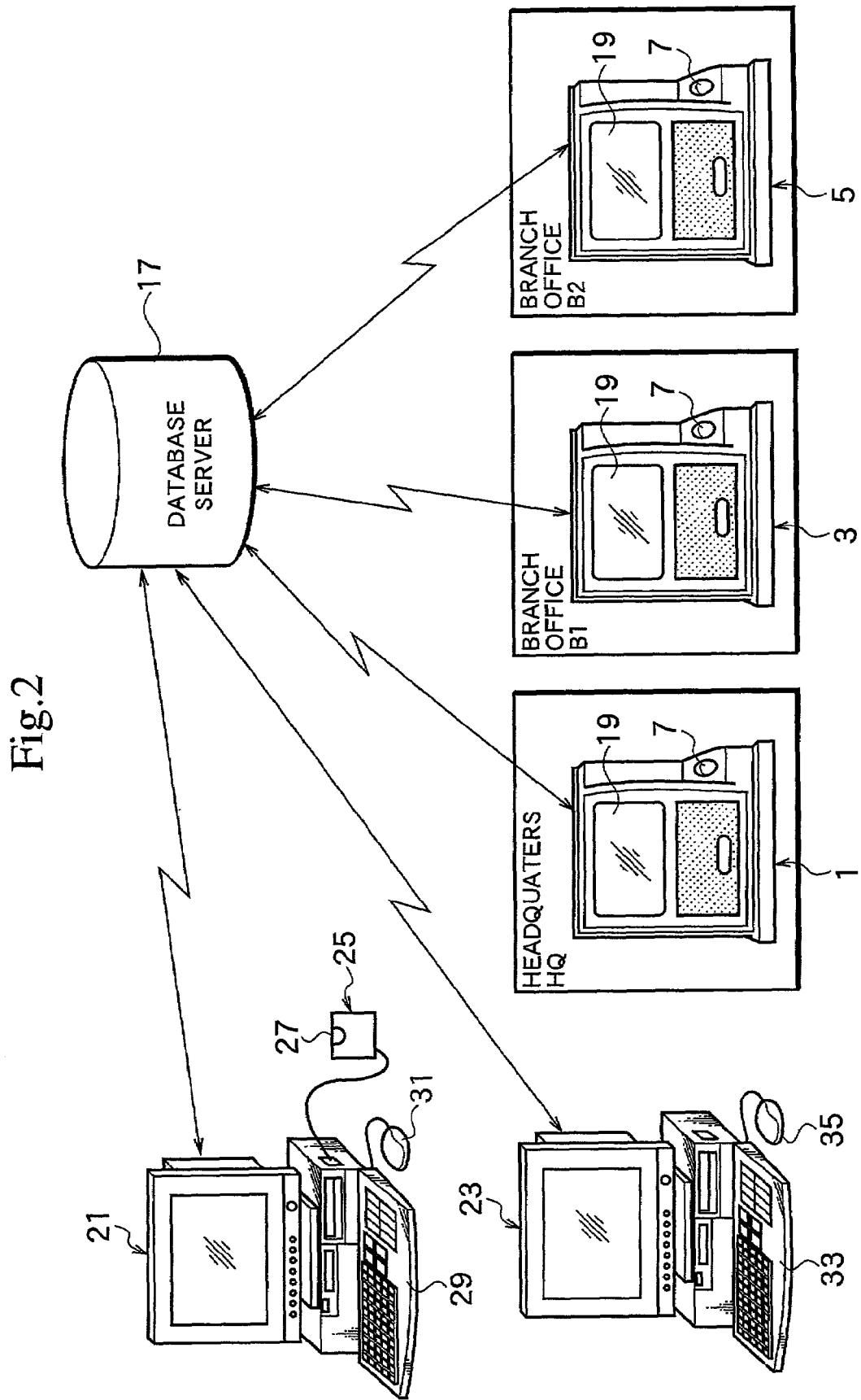
FIG. 2 is a block diagram showing a worker management device which an embodiment according to the present invention is applied.

FIG. 2 is a block diagram showing a worker management device according to an embodiment of the present invention. In the worker management device of the present embodiment, the time clocks 1, 3, and 5 are provided in the headquarters HQ, a branch office B1, a branch office B2, or the like as a plurality of work places, respectively. Each of the time clocks 1, 3, and 5 comprises an input section 7 as the fingerprint inputting means CL11 (FIG. 1) on which the worker puts, for example, his/her index finger, and a touch panel screen 19 as information inputting means.

Figure 3:
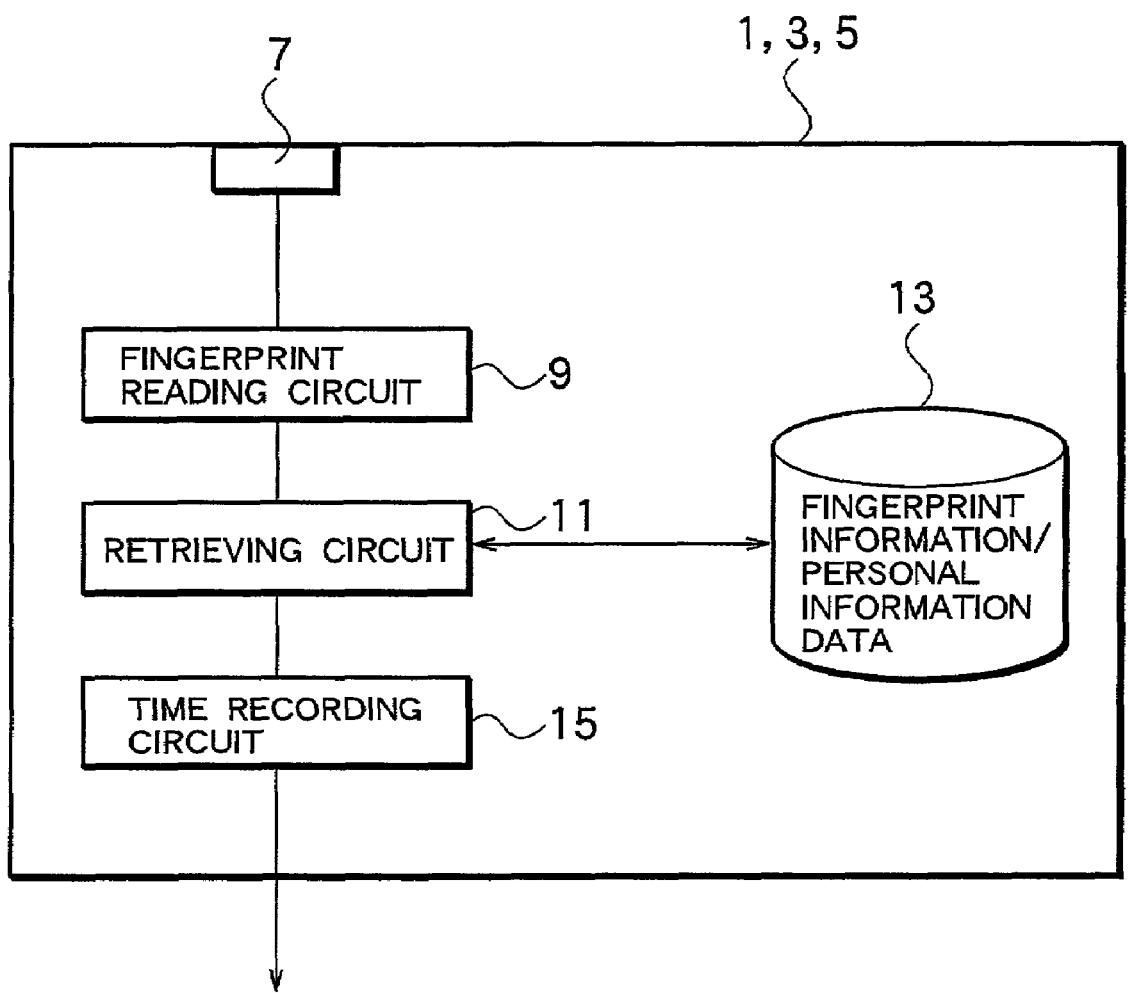
FIG. 3 is a block diagram showing a time clock of the worker management device according to the embodiment.

FIG. 3 is a block diagram showing a time clock of the worker management device according to the embodiment. Each of the time clocks 1, 3, and 5 comprises a fingerprint reading circuit 9, a retrieving circuit 11, fingerprint information/personal information data 13, and a time recording circuit 15 as shown in FIG. 3.

The fingerprint reading circuit 9 configures the fingerprint inputting means CL11 (FIG. 1) together with the input section 7. The fingerprint reading circuit 9 is directed for reading the fingerprint input from the input section 7. The retrieving circuit 11 configures the worker specifying means CL12 (FIG. 1). The retrieving circuit 11 is directed for fetching the personal information and the fingerprint information of the stored worker, conducting collation with the fingerprint read in the fingerprint reading circuit 9, and specifying the worker.

The fingerprint information/personal information data 13 configures the worker specifying means CL12 (FIG. 1) together with the retrieving circuit 11. The fingerprint information/personal information data 13 has the personal information and the fingerprint information of each worker stored therein in advance. The fingerprint information and the personal information stored in this fingerprint information/personal information data 13 are downloaded from a database server 17 shown in FIG. 2. However, a configuration may be employed in which the fingerprint information and the personal information are input and stored in the respective time clocks 1, 3, and 5. Further, a configuration may be employed in which the personal fingerprint data stored in an IC card in advance by a card reader of each of the time clocks 1, 3, and 5 is downloaded.

The time recording circuit 15 configures the time recording means CL13 (FIG. 1), and is directed for having worker's entrance and exit times recorded therein on the basis of the specification of the worker according to the retrieving circuit 11 to output. The output of this time recording circuit 15 is configured to be fetched into the database server 17 shown in FIG. 2.

As the managing means CL2 (FIG. 1), as shown in FIG. 2, in addition to the database server 17, a registration terminal device 21 and a management terminal device 23 are provided. However, both the terminal devices 21 and 23 may be configured with one device.

The database server 17 configures data storing means, and is directed for having the fingerprint information and the personal information of the worker stored therein in advance outputting the respective information to the time clocks 1, 3, and 5, and being inputted the time recording information from the time clocks 1, 3, and 5 therein as described above.

The registration terminal device 21 is configured with, for example, a desktop type personal computer, and is directed for inputting the fingerprint information and the personal information of the worker into the database server 17. In other words, a fingerprint input device 25 is connected thereto, and the fingerprint input device 25 is provided with an input section 27. The registration terminal device 21 is provided with a keyboard 29 and a mouse 31 to input the personal information therein. The personal information to be input includes a name and an employee code of each worker, and further a classification such as a full-time worker, a temporary worker and a part-time worker, or the like.

The management terminal device 23 is configured with, for example, a desktop type personal computer as with the registration terminal device 21. The management terminal device 23 is directed for inputting the time recording information from the database server 17 therein, and managing a working situation of each worker on the basis of the time recording information. Further, a working form or the like of each worker are input into this management terminal device 23. The working form includes a table of work shifts by which the worker staggers work shifts and works. The management terminal device 23 is also provided with an operating keyboard 33 and a mouse 35 as the keyboard 29 and the mouse 31 of the registration terminal device.

Figure 4:
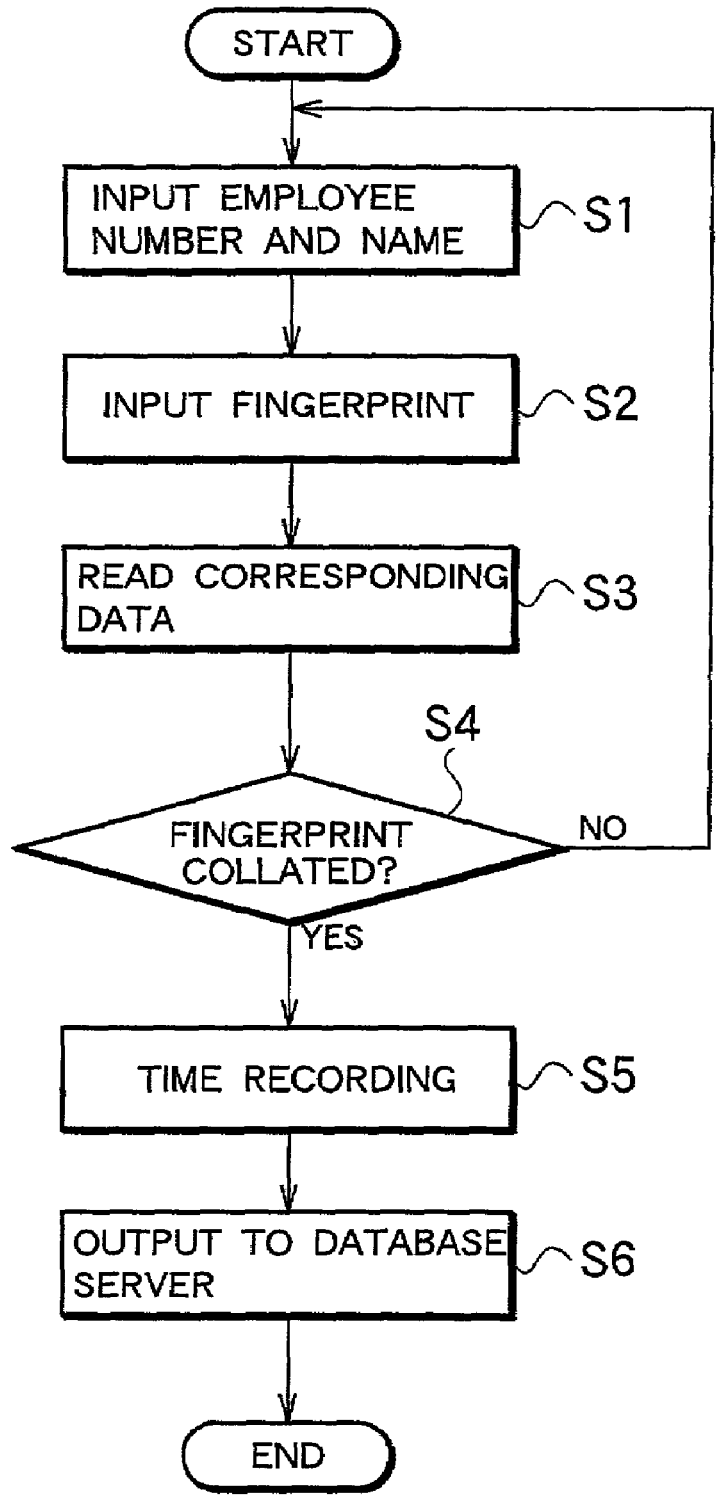
FIG. 4 is a flow chart showing a movement of the time clock device according to the embodiment.
Figure 5:
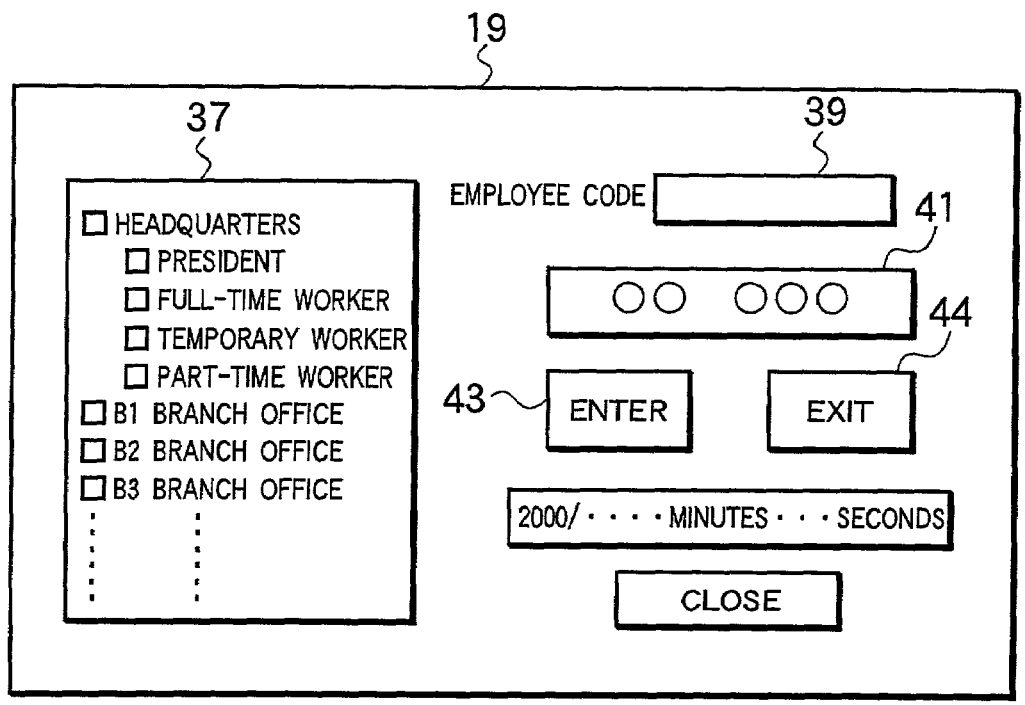
FIG. 5 is an explanatory diagram showing a touch panel of the worker management device according to the embodiment.
Figure 6:
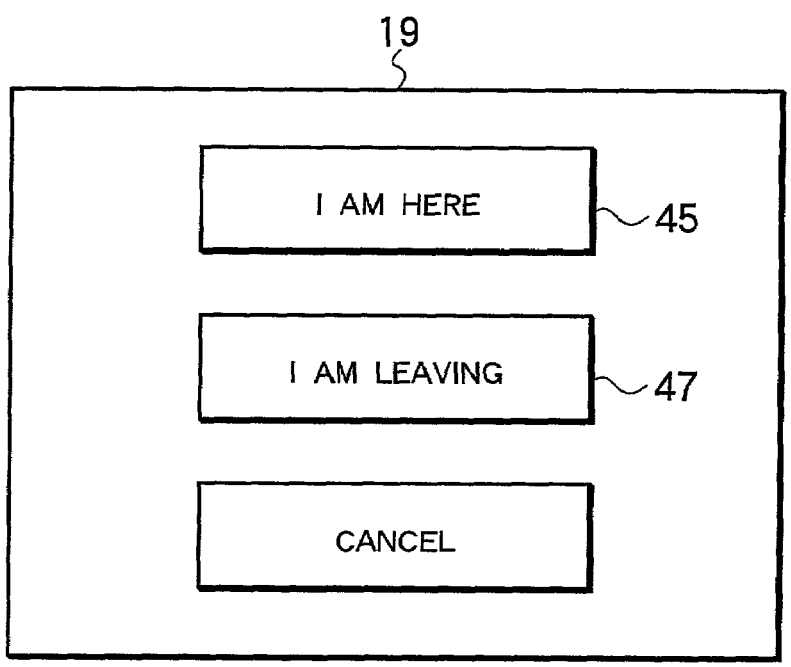
FIG. 6 is an explanatory diagram showing the touch panel of the worker management device according to the embodiment.

FIG. 4 is a flow chart showing an operation of each of the time clocks 1, 3, and 5. FIG. 5 and FIG. 6 show the screen 19 of each of the time clocks 1, 3, and 5. As shown in FIG. 4, at first, in step S1, a processing for inputting a worker number (employee code) and worker's name is conducted. In this processing, when an employee who is any one of full-time worker, temporary worker, or part-time worker touches the screen 19 of each of the time clocks 1, 3, and 5 by his/her finger, the screen as shown in FIG. 5 is started. In this screen, at first, the worker number is input. This worker number is displayed in an employee code display column 39. In this case, a configuration may be employed in which the card readers are provided in the respective time clocks 1, 3, and 5 so that the worker number is input with an IC card or a magnetic card.

Next, worker's own name is selected on the screen. This selection is conducted as follows. For example, when an employee comes to work at the headquarters HQ, he/she touches characters of the headquarters, and when the employee comes to work at the branch office B1, he/she touches characters of the B1 branch office. Then, for example, in case where the employee is a full-time worker, he/she touches characters of the full-time worker. With this touch, the names of the full-time workers are displayed on a display column 37. When the worker selects his/her own name from among this display, his/her name is displayed on, for example, a name display column 41. Further, if the worker enters the work place, he/she touches an entrance display column 43, and if the worker exits from the work place, he/she touches an exit display column 44. Thereby, worker's entrance and exit times can be recorded. A configuration may be employed in which entrance and exit are correlated, when each of the time clocks 1, 3, and 5 is operated again after the worker entered, this fact is automatically recognized as the exit, and when each of the time clocks 1, 3, and 5 is operated again after the worker exited, the fact is automatically recognized as the entrance.

Next, in step S2 in FIG. 4, the fingerprint input is conducted. In this case, for example, when the entrance display column 43 (FIG. 5) or the exit display column 44 (FIG. 5) is touched, a speech output such as "conduct fingerprint input" is conducted. According to the speech, the worker puts his/her index finger on the input section 7 of each of the time clocks 1, 3, and 5 and inputs his/her own fingerprint.

In step S3, the reading of corresponding data is conducted. In other words, in step S1, the input of the employee code and the name is conducted, and only the worker data corresponding to this input is read into the retrieving circuit 11. Therefore, it is possible to rapidly conduct retrieval.

Next, in step S4, the read employee number, name information and fingerprint information are collated with the fingerprint input in the step S2. In this collation, when the worker is not specified, a process returns to step S1, and the respective steps S1, S2, and S3 are conducted again.

Therefore, when the time recording is conducted in each of the time clocks 1, 3, and 5, other person than the worker his/herself is refused and the time recording by the other person in place of the worker his/herself can be prevented. At this time, the display as shown in FIG. 6 is conducted on the screen 19. This display is directed for confirming a registration, when the worker enters the work place, he/she touches a display column 45, and when the worker exits from the work place, he/she touches a display column 47. When the registration is confirmed through this touch, in step S5 in FIG. 4, a processing of the time recording is conducted, and a time at that time is recorded in the time recording circuit 15.

Next, in step S6 in FIG. 4, a processing for outputting to the database server is conducted, and the time recording result is output to the database server 17 (FIG. 2). Therefore, an administrator can operate the keyboard 33 and the mouse 35 of the management terminal device 23, access the database server 17 to fetch the time recording result, and confirm the working situation of the worker. In other words, it is possible to easily determine by the management terminal device 23 at which one of the headquarters HQ, the branch office B1, and the branch office B2 the employee is. Further, it is possible to determine with remarkable ease at which one of the headquarters HQ, the branch office B1, and the branch office B2 and how long the employee has engaged according to the time recording of his/her entrance and exit times by each of the time clocks 1, 3, and 5.

In the management terminal device 23, the time recording result is shown on the table of the work shifts, and it is possible to accurately conduct the working management of the full-time workers, the temporary workers, and the part-time workers, or the like. Particularly, in recent years when a so-called work sharing is needed, it is remarkably effective to collectively determine the working situations of all the employees on the table of the work shifts.

Further, a payroll accounting software is input into the management terminal device 23, so that the payroll accounting can be easily conducted on the basis of the time recording information. The payroll accounting result is output from a printer, for example, which is connected to the management terminal device 23, so that the pay advice of all the employees can be acquired with remarkable ease. In this case, a unit wage table for each of full-time workers, temporary workers, and part-time workers is input, so that, along with the input of the time recording information, the payroll accounting can be easily conducted even for the employee whose unit wage is different from the unit wage of the other employees.

Further, in a security company or the like, the unit wage of a security guard is different depending on a place where he/she guards, also in such a case, it is possible to determine where and how long the security guard has been, and further it is possible to accurately conduct the payroll accounting according to the unit wage, or the like.

Figure 7:
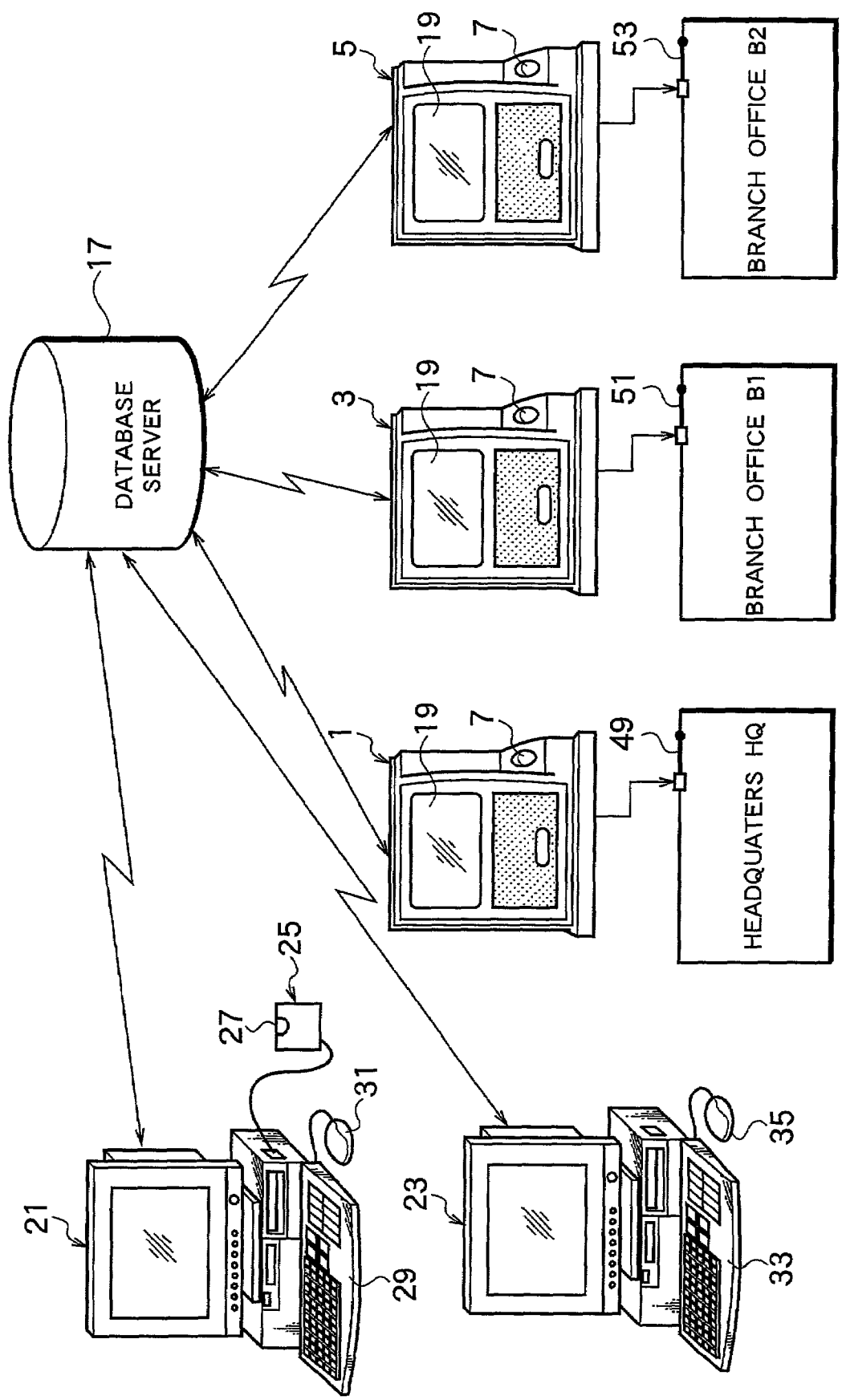
FIG. 7 is a block diagram showing a worker management device according to another embodiment of the present invention.

FIG. 7 shows another embodiment according to the present invention. Like reference numerals are denoted to constituents corresponding to those in the above embodiment.

In the present embodiment, electric lock doors 49, 51, and 53 for entrance and exit are provided for the headquarters HQ, the branch office B1, and the branch office B2, respectively. Further, each of the time clocks 1, 3, and 5 is provided with a non-voltage contact relay for an electric lock. When the worker is specified with the fingerprint input, in each of the time clocks 1, 3, and 5, the non-voltage contact relay is closed, and a lock release signal is output to each of the electric lock doors 49, 51, and 53.

Therefore, in the present embodiment, as far as the employee is not specified, the electric lock doors 49, 51 and 53 are not opened, and other persons than the specified workers cannot enter and exit from the work place, which is remarkably effective in the interests of crime prevention.

What is claimed is:

1. A worker management device comprising:
   time clocks provided in a plurality of work places for recording entrance and exit times for each worker; and
   managing means for inputting time recording information from the respective time clocks;
   the managing means operating independently of and being connected to the time recorders so that said management device determines where the worker has entered and exited and tow long the worker has engaged therein;
   the managing means including data storing means storings in advance fingerprint information and personal information of the workers and communicating the respective information to the time clocks;
   wherein the time clocks each comprise:
      fingerprint inputting means for inputting a fingerprint of each worker;
      worker specifying means including:
         fingerprint information/personal information data, said data including personal information and fingerprint information of each worker therein, said information being downloaded from the data storing means; and
         a retrieving circuit for retrieving the personal information and the fingerprint information stored in the fingerprint information/personal information data and for conducting collation of the input fingerprint inputted with the fingerprint inputting means to specify the worker; and
      time recording means for recording entrance and exit times on the basis of the specification of the worker by the worker specifying means, and information inputting means for inputting personal information and employment status of a worker, said employment status being one of full-time, temporary, or part-time; and
   said worker specifying means reading said stored personal information and fingerprint information according to said personal information input into said information inputting means for conducting said collation.

2. A worker management device according to claim 1, wherein the time clocks each comprise information inputting means for inputting personal information, and the worker specifying means reads the stored personal information and fingerprint information according to the input personal information inputted with the information inputting means to conduct the collation.

3. A worker management device according to claim 1, wherein the managing means comprises data storing means for storing the fingerprint information and the personal information of the worker therein in advance and outputting the respective information to the time clocks, and being inputted the time recording information from the time clocks therein, a registration terminal device for inputting the fingerprint information and the personal information of the worker into the data storing means in advance, and a management terminal device for inputting the time recording information from the data storing means therein and managing a working situation of each worker on the basis of the time recording information.

4. A worker management device according to claim 2, wherein the managing means comprises data storing means for storing the fingerprint information and the personal information of the worker therein in advance and outputting the respective information to the time clocks, and being inputted the time recording information from the time clocks therein, a registration terminal device for inputting the fingerprint information and the personal information of the worker into the data storing means in advance, and a management terminal device for inputting the time recording information from the data storing means therein and managing a working situation of each worker on the basis of the time recording information.

5. A worker management device according to claim 1, wherein the work places each comprise an electric lock door for entrance and exit, and the time clocks each output a lock release signal to the electric lock door on the basis of the worker specification by the worker specifying means.

6. A worker management device according to claim 2, wherein the work places each comprise an electric lock door for entrance and exit, and the time clocks each output a lock release signal to the electric lock door on the basis of the worker specification by the worker specifying means.

7. A worker management device according to claim 3, wherein the work places each comprise an electric lock door for entrance and exit, and the time clocks each output a lock release signal to the electric lock door on the basis of the worker specification by the worker specifying means.

8. The management device of claim 1 wherein:
   said information inputting means receives a unit wage table for each of full-time workers, temporary workers, and part-time workers; and
   said device processing payroll accounting for each worker based on said worker specified by said worker specifying means, said unit wage table input into said information inputting means and said entrance and exit times recorded in said time recording means.

* * * * *